Inventor
Harry A. Foothorap

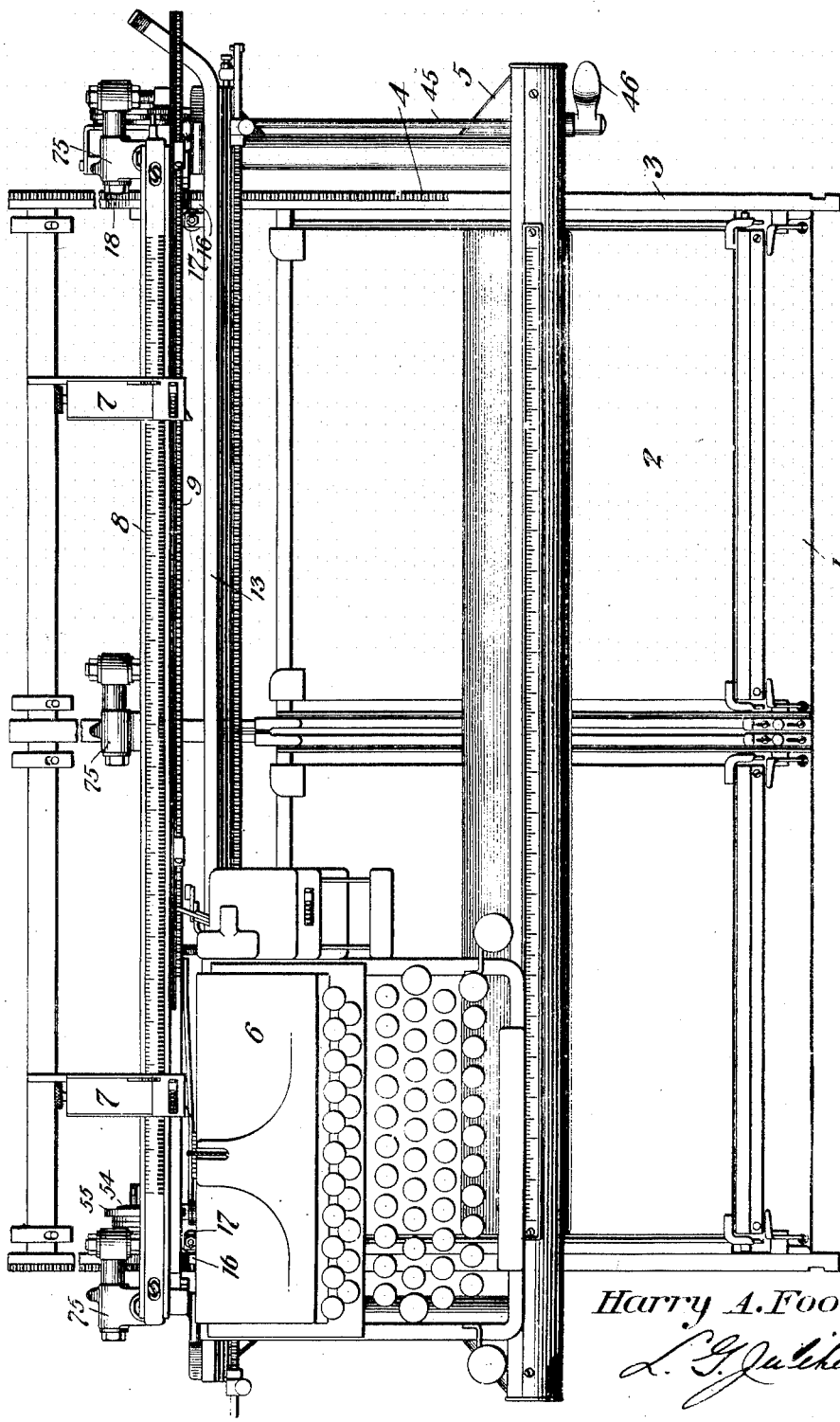

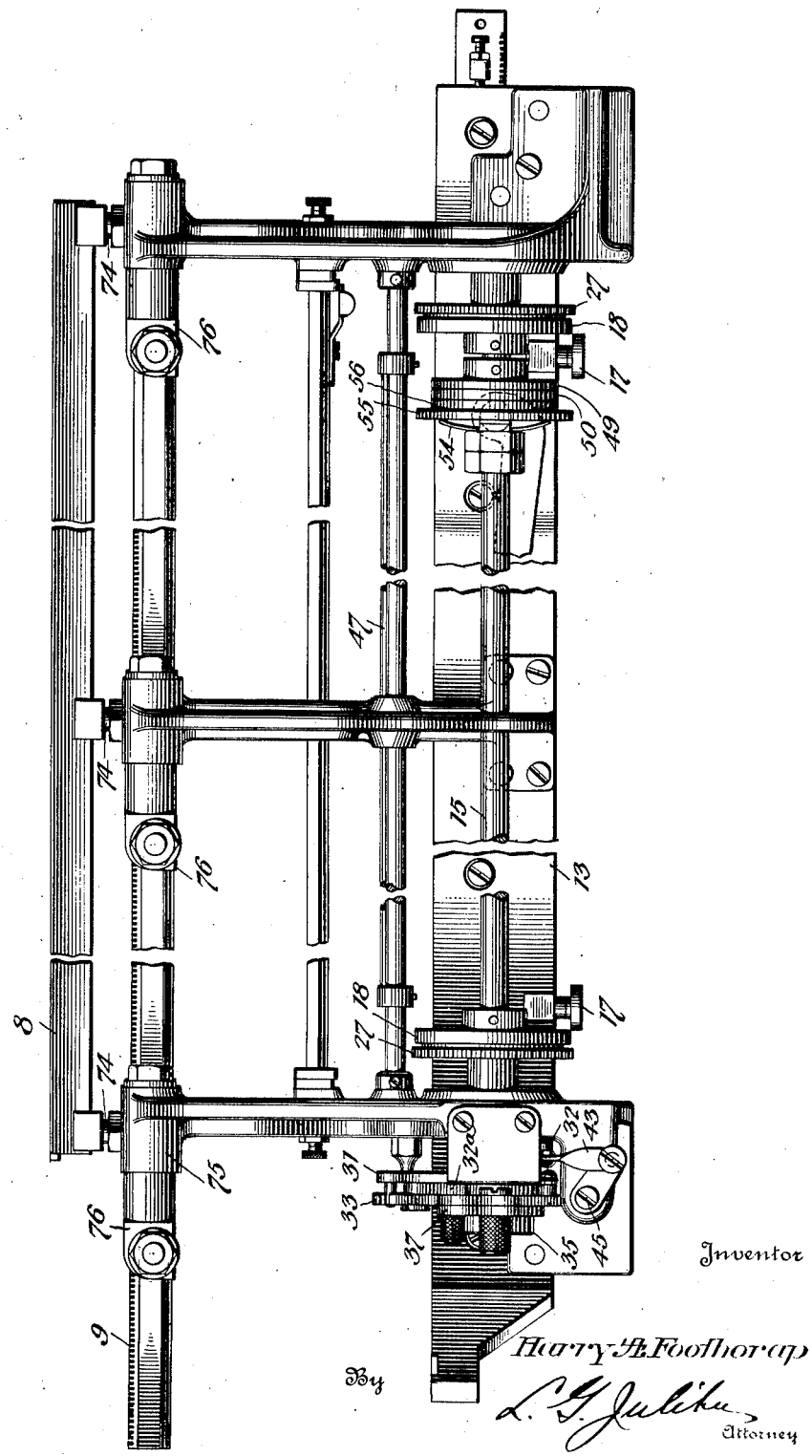

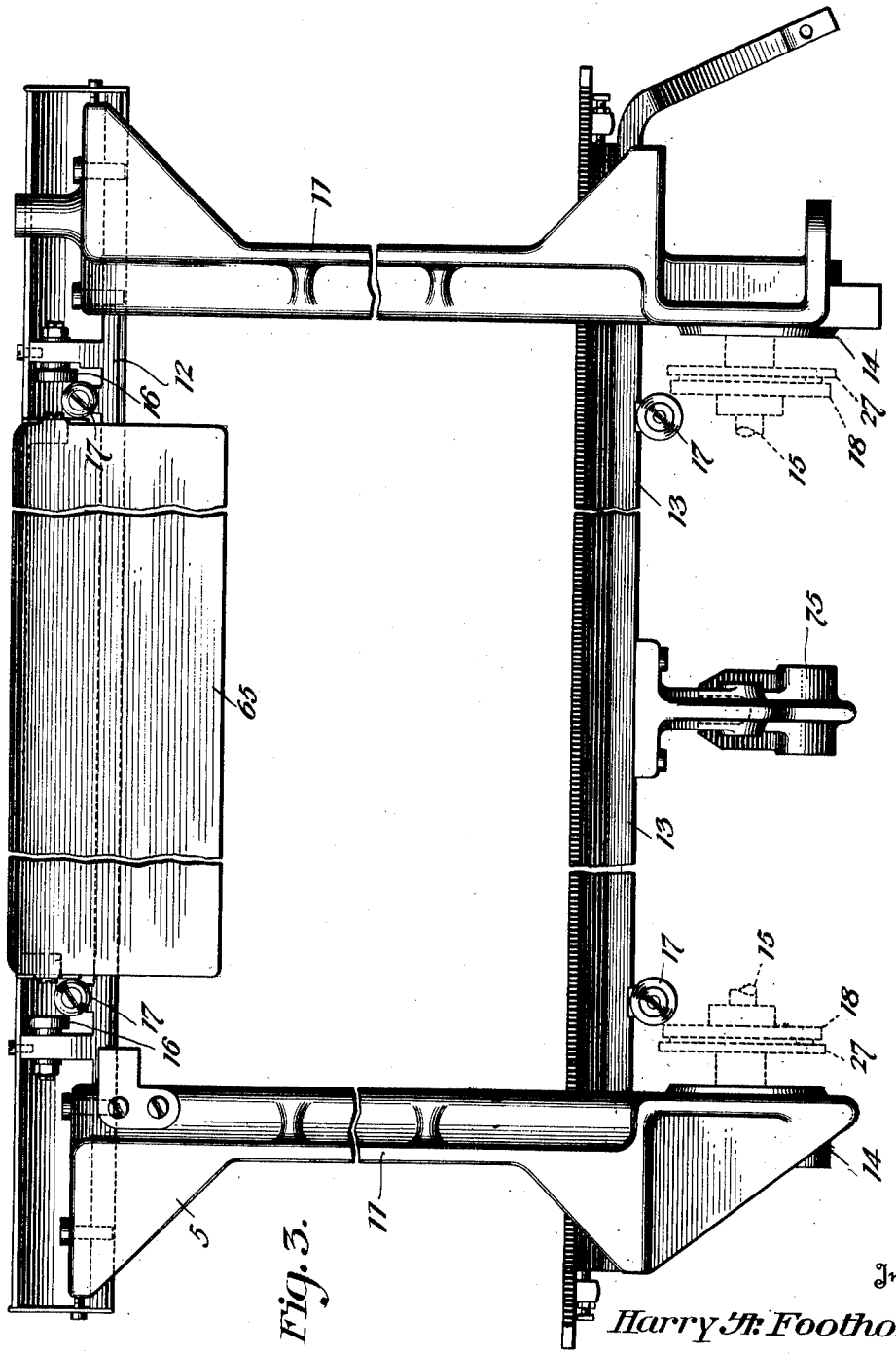

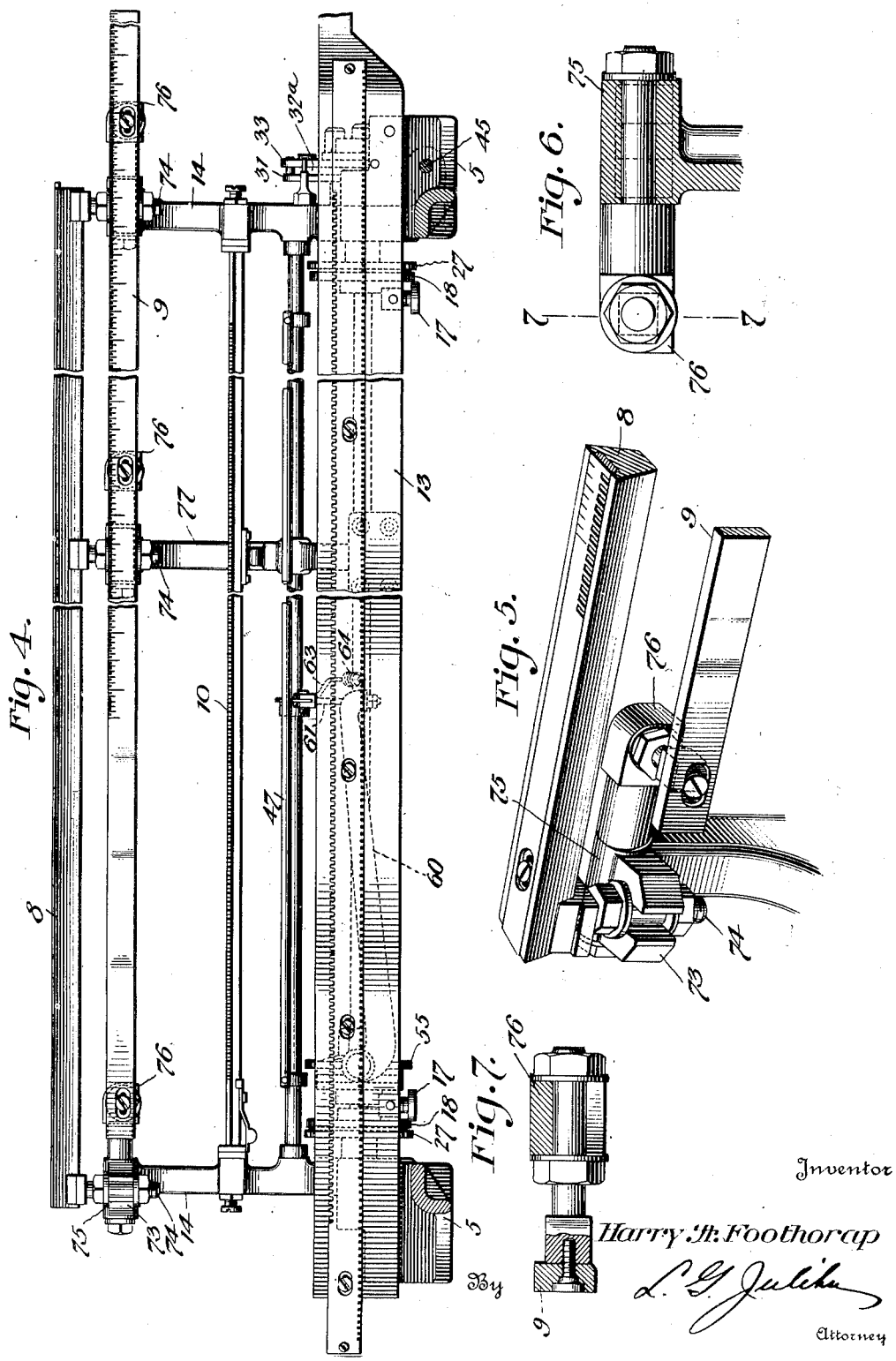

July 2, 1929.  H. A. FOOTHORAP  1,719,176
BILLING MACHINE
Filed March 25, 1927   8 Sheets-Sheet 6
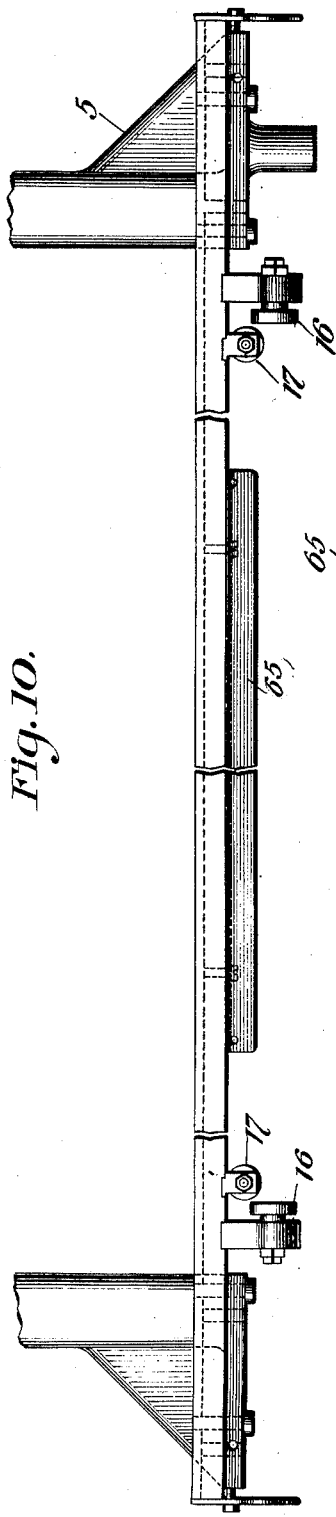
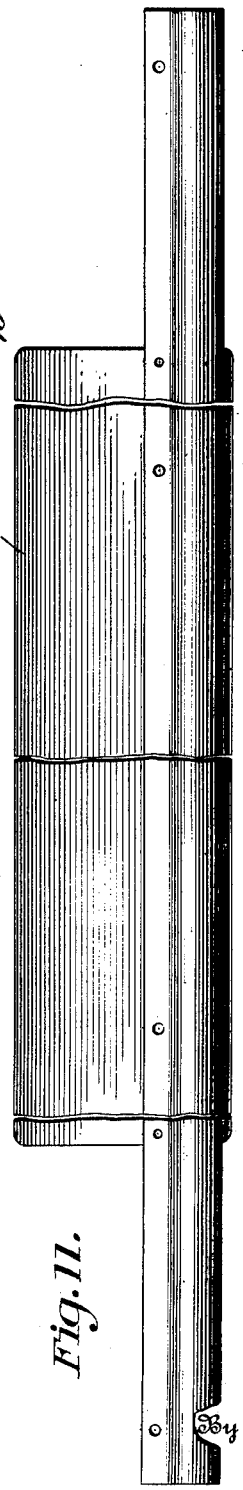
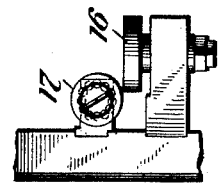
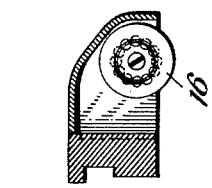
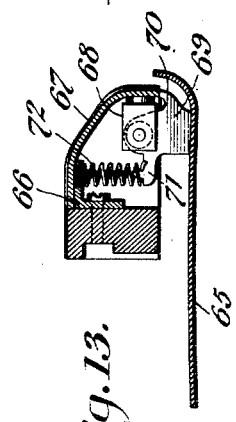
Inventor
*Harry H. Foothorap*
By
Attorney July 2, 1929.  H. A. FOOTHORAP  1,719,176
BILLING MACHINE
Filed March 25, 1927  8 Sheets-Sheet 7

Inventor
Harry H. Foothorap
By L. G. Julihn
Attorney

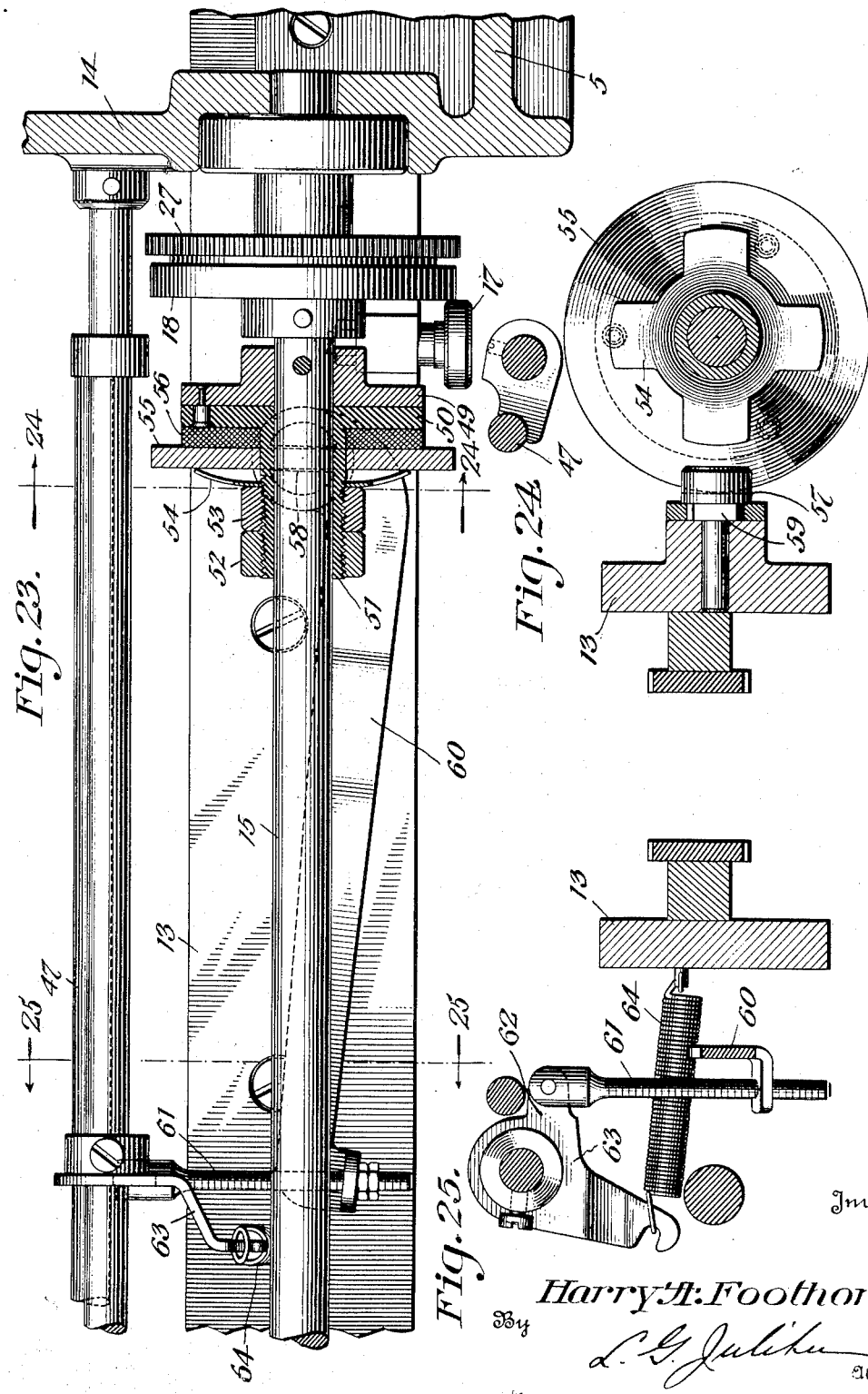

Patented July 2, 1929.

1,719,176

UNITED STATES PATENT OFFICE.

HARRY A. FOOTHORAP, OF HARRISBURG, PENNSYLVANIA, ASSIGNOR TO ELLIOTT-FISHER COMPANY, OF HARRISBURG, PENNSYLVANIA, A CORPORATION OF DELAWARE.

BILLING MACHINE.

Application filed March 25, 1927. Serial No. 178,349.

This invention relates to billing machines of that type in which letter and line space carriages are mounted one upon another and move relatively to a fixed support.

The object of the invention is to improve the construction of the line space frame or carriage, and its several features of equipment to secure freer movement and better control of such movement and to materially reduce the elements of wear and manufacture costs.

Subordinate objects are to provide an improved depressor plate and mounting; to eliminate the line space shaft as a support for the elements of the line spacing mechanism; to improve and simplify the brake, the method of mounting the register and control bars, and the method of securing the line space gear to the shaft.

Other objects will appear during the course of the succeeding description.

In the accompanying drawings:

Figure 1 is a plan view of a billing machine of the Elliott-Fisher type.

Figure 2 is a rear elevation of the line space frame and its equipment.

Figure 3 is a bottom plan view thereof.

Figure 4 is a sectional view showing a front elevation of the rear portion of the line space frame.

Figure 5 is a perspective view of the end mountings of the register bar and the control bar.

Figure 6 is a detail sectional elevation of the control bar mountings.

Figure 7 is a detail section on the line 7—7 of Figure 6.

Figure 10 is a plan view of the front portion of the frame with the shield and depressor plate removed.

Figure 11 is a plan view of the shield and depressor plate.

Figure 12 is a view of the scale plate.

Figure 13 is a sectional view through the front frame bar, shield and depressor plate.

Figure 14 is another detail section through the front bar.

Figure 15 is a detail of the anti-friction rollers.

Figure 23 is a sectional elevation of one end of the line space shaft and the brake mechanism.

Figure 24 is a section on the line 24—24 of Figure 23.

Figure 25 is a section on the line 25—25 of Figure 23.

Figure 8:
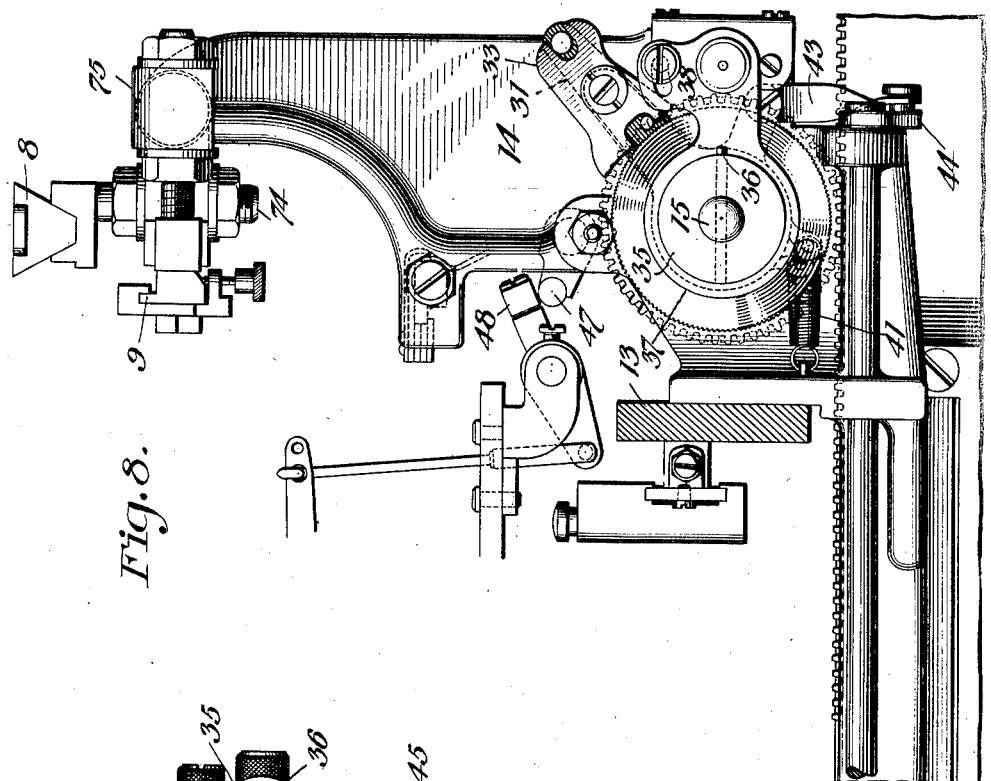
Figure 8 is a side elevation of a portion of the machine including the line space frame, the near extremity of the rear carriage rail being broken away.
Figure 9:
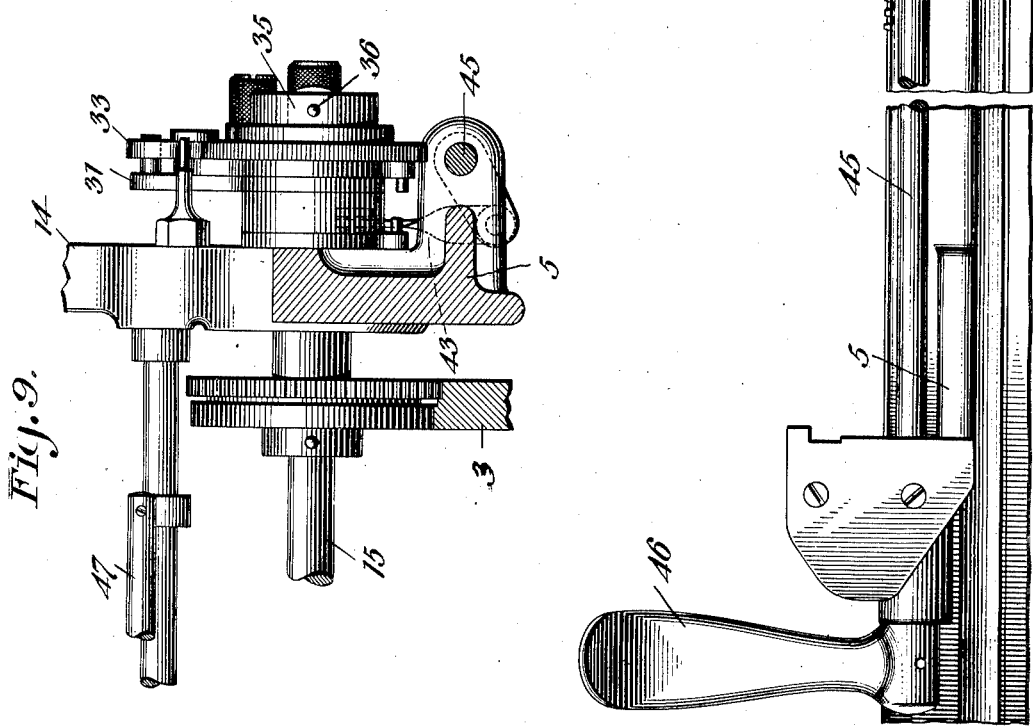
Figure 9 is a front elevation of the line spacing mechanism.
Figure 16:
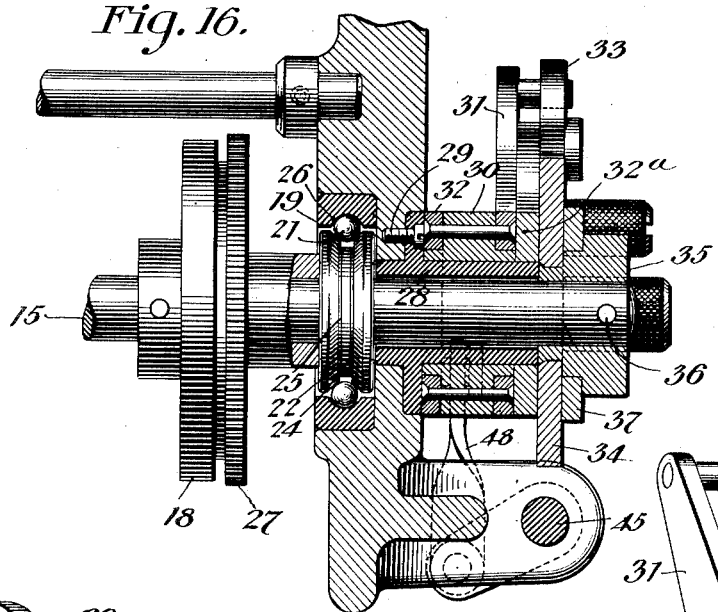
Figure 16 is a sectional view through the line spacing mechanism.
Figure 18:
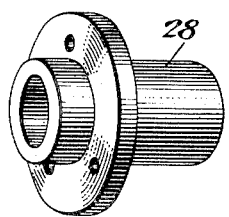
Figure 18 is a detail perspective view of the fixed bearing sleeve for the line space mechanism.

1 indicates the stationary platen frame supporting one or more platens 2, and having side rails 3 toothed as shown at 4, and supporting a movable line space frame 5. On the frame 5 is movable transversely of the platens, a carriage 6 equipped with key operated printing and differential mechanisms, respectively, which operate, in a manner well understood in the art, one to print numbers and the other to actuate one or more adding devices or registers 7. It has not been considered necessary to illustrate the printing and differential mechanism since for a detailed understanding of these features reference may be had to my Patent No. 1,421,201. The registers 7 are ordinarily mounted on a register bar 8, below which is a state control bar 9 and a tabular bar 10.

In accordance with my present invention, frame 5 is composed (Figure 3) of side members 11 and front and rear frame bars 12 and 13, respectively, bolted or otherwise secured thereto. The side members are cast integral with side brackets 14 extended behind bar 13 and serving as mountings for the line space shaft 15 and the register and control bars.

Figure 17:
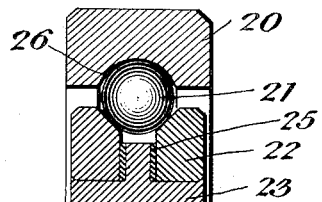
Figure 17 is a similar view of one of the bearings for the line space shaft.
Figure 21:
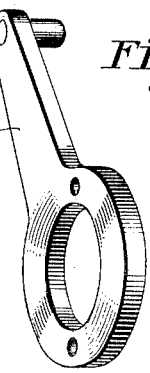
Figure 21 is a detail view of the dog rocker.
Figure 19:
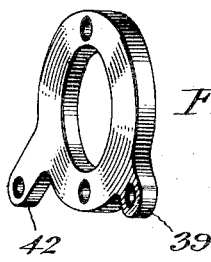
Figure 19 is a detail of the collar.
Figure 20:
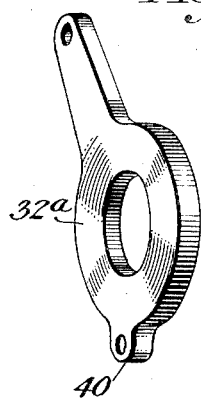
Figure 20 is a similar view of the hub.
Figure 22:
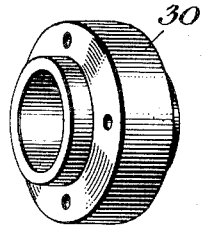
Figure 22 is a similar view of the dog carrier.

To insure smooth running of the frame on the rails 3, the front frame bar is equipped with supporting rolls 16 and both the front and rear frame bars are equipped with guide rolls 17, rotatable on ball-bearings. The rear supporting rolls 18, which are mounted on the line space shaft 15, are also made ball-bearing by mounting the shafts in ball-bearings 19 in the rear frame brackets. These bearings 19, shown in detail in Figure 17, comprise a ball race 20 fixed in the frame, and balls 21 interposed between the race and a pair of annular bearing members 22, carried by a collar 23 encircling the shaft and having an annular flange 24 interposed between the members 22 and separated therefrom by annular spacers 25. The race 26 is struck on a somewhat larger radius than that of the balls, so that the latter are provided with three limited points of contact with the elements of the bearing. Associated with the rear supporting rollers 18 are gears 27, which engage the toothed portions 4 of the rails.

In accordance with my present invention, the line spacing mechanism, which in its mode of operation is not novel, contemplates its removal from the shaft which has ordinarily constituted the supporting or bearing element for the line spacing elements. Instead of mounting these movable parts on the shaft, I provide a fixed bearing sleeve 28 encircling the shaft 15 and screwed or otherwise rigidly secured to one of the brackets of the frame as indicated at 29. On this sleeve 28 rotates a hub 30, to which are fixed the dog rocker 31 and collar 32. Also mounted on the sleeve is the dog carrier 32ª on which is mounted the usual line space dog 33 arranged to engage a knurled line space wheel 34 swaged on a hub 35, which is pinned to the shaft as indicated at 36. The diameter of the hub 35 is reduced adjacent to the outer side of the line space wheel 34, and receives the hub 37 of the usual line space stop levers 38.

The collar 32 and the dog carrier 32ª are provided with lugs 39 and 40 for the connection of retracting springs 41, and the collar 32 is provided with an additional lug 42 for the attachment of a link 43 extending from a crank 44 at the rear of the shaft 45 provided at the front end of the frame with the hand operated line space lever 46.

The mode of operation of this mechanism is ordinary and need not be described in detail.

It is usual in this type of machine to provide the line space frame with a brake, which securely retains the printing mechanism in accurate printing position. This mechanism is associated with the brake release bail 47 operated by a brake release key on the carriage, through the medium of a bail operator 48 as indicated in Figure 8 of the drawings.

In accordance with my present improvement the brake, see Figure 23, includes a disc 49 pinned to the shaft 15 and fixed to a second disc 50, having an elongated hub 51 threaded to receive nuts 52 and 53 constituting a backing for a spring spider 54, designed to urge a brake disc 55 into frictional engagement with a rubber, fabric or other friction disc 56 interposed between the discs 50 and 55.

It is obvious that if the disc 55 is held against rotation material frictional resistance will be opposed by it to the rotation of the shaft 15. Therefore, mounted on the rear frame member is a rocking retarding member 57 having a transverse slot 58 which receives the edge of the disc 55, but is of slightly greater width than the thickness of the disc. The stem of the member 57 has an annular portion 59 engaged by a brake lever 60 connected at its opposite end by means of a link 61 with one arm 62 of the lever 63 fixed to the brake releasing bail 47. Normally, the spring 64, which retains the bail in its elevated position serves to elevate the outer end of the lever 60 for the purpose of turning the retarding member 57 sufficiently to clamp and retard the disc 55.

Another improved feature of the present construction embraces the mounting for the depressor plate 65 located at the front of the frame and designed to depress and smooth out the work as the frame moves over the platen. Secured to the front side of the front frame bar is an angle bracket 66 to which is attached the front shield 67. Within this shield are disposed rearwardly extending lugs 68 on which are pivoted ears 69 fixed to a depressor plate and each having a stop lug 70 engaging the edge of the shield and a lug 71 between which, and the angle bracket 66, is interposed a spring 72, which serves to resist the swinging of the depressor plate in one direction.

The final feature of this improved construction is the mounting of the register and control bars 8 and 9 as will be seen in Figures 5, 6 and 7. The frame brackets are cast with open lugs 73 to receive the register bar supports 74, and with sleeves 75 for the attachment of the supports 76 for the control bar. In other words, each of the side brackets of the frame as well as the separate intermediate bracket 77 are formed for the convenient and effective attachment of the supporting devices for the two bars.

It is thought that from the foregoing the construction of the improvements effected by me will be clearly understood, but I reserve the right to effect such modifications of the illustrated structure as may come fairly within the scope of the appended claims.

What I claim is:

1. A line space frame for billing machines, including front, rear and side members, and brackets disposed vertically at the rear ends of the side members and formed integral therewith, each of said brackets having formed thereon a horizontal sleeve and an open lug to facilitate the attachment of the register and control bars.

2. The combination with a line space frame, having upstanding brackets provided with a lined sleeve and rearwardly disposed open lugs, of a control bar mounting, retained by the sleeves, and a register bar mounting retained by the open lugs.

3. The combination with a line space frame and a shield carried thereby, of a depressor plate having a pivotal mounting within the shield, a spring urging the depressor plate in one direction, and a stop limiting the movement of the depressor plate.

4. The combination with a line space frame, of a depressor plate having ears pivoted to the frame, and provided at opposite sides of their pivots with a stop lug and a spring lug, and a spring bearing upon the spring lug to retain the depressor plate in one position.

5. The combination with a line space frame, of an angle bar secured thereto, a shield secured to the angle bar, and having rearwardly extended lugs, a depressor plate having ears pivoted to said lugs and stops engaging the shield, and springs interposed between the angle bar and the ears of the depressor plate to resist the movement of said plate from its normal position.

6. The combination with a support, and a line space frame including a front bar, of supporting and guiding rolls mounted on the front of the bar, a shield in the form of an open bottom housing removably mounted on the front of the bar to cover said rolls, and a depressor plate carried by said shield for removal therewith and having a mounting housed within said shield.

In testimony whereof I affix my signature.

HARRY A. FOOTHORAP.